United States Patent [19]

Shimizu et al.

[11] 4,362,858

[45] Dec. 7, 1982

[54] PROCESS FOR PRODUCING AN AROMATIC POLYESTER COPOLYMER

[75] Inventors: Senzo Shimizu, Odawara; Isao Nomura, Hiratsuka; Motohachi Usui, Odawara; Mashahiro Harada, Hiratsuki, all of Japan

[73] Assignee: Mitsubishi Gas Chemical Co., Inc., Tokyo, Japan

[21] Appl. No.: 327,038

[22] Filed: Dec. 3, 1981

[30] Foreign Application Priority Data

Dec. 4, 1980 [JP] Japan ................ 55-171344

[51] Int. Cl.$^3$ .............. C08G 62/24; C08G 6/28
[52] U.S. Cl. .................. 528/179; 528/125; 528/126; 528/128; 528/173; 528/176; 528/180
[58] Field of Search ............... 528/125, 126, 128, 173, 528/176, 179, 180

[56] References Cited

U.S. PATENT DOCUMENTS 3,234,167  2/1966  Sweeny et al. .............. 528/176
4,201,855  5/1980  Segal ....................... 528/176
4,252,939  2/1981  Mori et al. ................. 528/179

Primary Examiner—Lester L. Lee
Attorney, Agent, or Firm—Wenderoth, Lind & Ponack

[57] ABSTRACT

A process for producing an aromatic polyester copolymer wherein the alternating configuration of the components making up the copolymer is highly regular, said process comprising a first step of reacting a dihydric phenolic compound with an aromatic dicarboxylic acid dichloride A in a reaction medium consisting of water and a water-immiscible solvent in the presence of a basic inorganic compound to give a phenolic hydroxyl-terminated aromatic oligoester containing predominantly an oligomer having a degree of polymerization of 1-2, and a second step of reacting the aromatic dihydroxy oligoester obtained in the first step with an aromatic dicarboxylic acid dichloride B in the presence of a basic inorganic compound in an amount at least sufficient to neutralize the free phenolic hydroxyl groups remaining in the reaction product mixture obtained in the first step.

5 Claims, No Drawings

, 858

PROCESS FOR PRODUCING AN AROMATIC POLYESTER COPOLYMER

FIELD OF THE INVENTION

This invention relates to a process for producing an aromatic polyester copolymer. More specifically, this invention relates to a process for producing an aromatic polyester copolymer having an alternating configuration of its components of high regularity, which process comprises a first step of reacting a dihydric phenolic compound with an aromatic dicarboxylic acid dichloride in a reaction medium consisting of water and a water-immiscible solvent in the presence of a basic inorganic compound to give a phenolic hydroxyl-terminated aromatic oligoester containing predominantly an oligoester having a degree of polymerization of 1-2, and a second step of reacting the oligoester thus obtained in the first step with an aromatic dicarboxylic acid dichloride of a class different from that used in the first step to prepare an aromatic polyester copolymer having a high molecular weight.

BACKGROUND OF THE INVENTION

It is well known that the aromatic polyester copolymers composed of the terephthalic acid, isophthalic acid and bisphenol A components find use in a wide range of areas in view of their superior properties such as their excellent mechanical and thermal properties, resistance to chemicals and fire retardancy. As methods for producing these aromatic polyester copolymers, there can be mentioned (1) the interfacial polycondensation process wherein the reaction is carried out in a reaction medium consisting of water and a water-immiscible solvent in the presence of a basic inorganic compound, (2) the solution polycondensation process wherein the reaction is carried out in an organic solvent in the presence of a tertiary amine, or (3) the melt polycondensation process wherein the reaction is performed using a high vacuum at elevated temperatures. Of these processes for producing the aromatic polyester copolymers, it can be said that the employment of the interfacial polycondensation process is to be preferred in view of such advantages as (a) the reaction can be carried out at room temperature and atmospheric pressure and be completed in a short period of time with no side reactions, (b) the production of the copolymer can be achieved by the use of a simple reaction apparatus, and (c) since there is a lesser inclusion of a catalyst, reaction solvent or dehydrochlorinating agent, a less colored polymer can be obtained. On the other hand, there are a number of defects that must be improved, such as (d) difficulty is experienced in separating the aqueous phase and water-immiscible solvent phase at the time of washing the reaction product mixture, with the consequence that there is a need for a complicated processing step, and (e) the step of solidification in which the intended polymer is recovered from the water-immiscible solvent phase cannot necessarily be carried out fully efficiently.

SUMMARY OF THE INVENTION

This invention provides a process wherein the foregoing defects of the interfacial polycondensation process have been improved on and aromatic polyester copolymers possessing superior physical properties are produced by this process. Regularity in the configuration of the components making up the copolymer is achieved by the process of this invention, and thus aromatic polyester copolymers having an alternating configuration of high regularity can be obtained by a simpler procedure.

There is thus provided according to this invention a process for producing an aromatic polyester copolymer which comprises in combination a first step wherein a dihydric phenolic compound is reacted with an aromatic dicarboxylic acid dichloride (hereinafter referred to herein as an aromatic dicarboxylic acid dichloride A) in a reaction medium consisting of water and s water-immiscible solvent in the presence of a basic inorganic compound to give a phenolic hydroxyl-terminated aromatic oligoester containing predominantly an oligoester having a degree of polymerization of 1-2, and a second step wherein the aromatic oligoester obtained in the first step is reacted with an aromatic dicarboxylic acid dichloride of a class different from that used in the first step (hereinafter referred to herein as an aromatic dicarboxylic acid dichloride B) in the presence of a basic inorganic compound in an amount at least sufficient to neutralize the free phenolic hydroxyl groups remaining in the reaction product mixture, whereby the polymerization reaction of the oligoester to the intended aromatic polyester copolymer is accomplished.

It is especially preferred that in the first step of the process of this invention the basic inorganic compound be used in an amount ranging from 0.6 to 1.4 moles per mole of the dihydric phenolic compound and the aromatic dicarboxylic acid dichloride A be used in an amount in the range of 0.3 to 0.7 mole per mole of the dihydric phenolic compound.

DETAILED DESCRIPTION OF THE INVENTION

The aromatic polyester copolymers obtained by the process of this invention have an alternating configuration in which the components making up the copolymer are disposed in the polymer chain with high regularity. When compared with the copolymer obtained by the conventional interfacial polycondensation process, in addition to its inherent properties, it possesses higher glass transition temperature and higher heat distortion temperature under load (for example, higher by ca. 10° C.) and is superior to thermal stability, and amazingly there has been a marked improvement in its resistance to hot water. To wit, when a molded piece of a copolymer obtained by the conventional process is dipped in hot water of 120° C. for 20 hours, not only numerous crazes are formed in the molded piece but also there appears a phenomenon of devitrification of the piece. On the other hand, even though a molded piece of a copolymer obtained by the process of this invention is dipped in hot water of 120° C. for 60 hours, practically no formation of crazes nor the occurrence of devitrification is observed.

In the process of this invention which provides an aromatic polyester copolymer possessing these superior properties, the reaction product resulting after completion of the polymerization reaction can be readily separated into an aqueous phase and a water-immiscible solvent solution phase containing the copolymer. This means that in carrying out the operation of purifying the reaction product mixture there is a marked improvement in such washing effects as the reduction of the number of washings and time required for separating the aqueous phase and the solvent phase after washing as well as that the amount of water remaining in the water-immiscible solvent solution phase is reduced. Hence, the commercial significance of the present invention is great. In addition, the solidification of the intended copolymer from the purified water-immiscible solvent solution phase can be achieved by a simple procedure of concentrating the copolymer-containing water-immiscible solvent solution to a polymer content of 15-25% by weight and then adding a poor solvent for the intended copolymer to the concentrated solution to precipitate the copolymer followed by its separation, wherein the poor solvent used is at least one member selected from the group consisting of lower aliphatic alcohols such as methanol, ethanol and propanol; ketones such as acetone; and esters such as ethyl acetate, and preferably a mixture of a lower aliphatic alcohol in an amount of 5-20% by weight and a ketone or an ester in an amount of 10-30% by weight, respectively based on said concentrated solution. Thus, as compared with the conventional method, the time required for solidifying the copolymer can be shortened greatly.

As the basic inorganic compound to be used in the process of this invention, there can be mentioned, for example, lithium hydroxide, sodium hydroxide, calcium hydroxide, trisodium phosphate or sodium carbonate. In practicing the first step, usually, the basic inorganic compound is added to water along with a dihydric phenolic compound and used in the form of a phenolic salt in solution in water. It is one of the significant requisites of this invention that the amount used of the basic inorganic compound ranges from 0.6 to 1.4 moles per mole of the dihydric phenolic compound. Hence, as a consequence of the adoption of this condition, the dihydric phenolic compound is only partially neutralized. As a result, the dihydric phenolic compound that does not form a salt does not dissolve in the aqueous phase but remains dispersed as solids in the reaction medium. Even in a reaction system of this kind, it was found that the phenolic hydroxyl group and the aromatic dicarboxylic acid dichloride A readily react to give the aforesaid aromatic oligoester having a degree of polymerization of 1-2 with good selectivity and in a high yield. The foregoing condition is critical for obtaining the oligoester of this invention. When the upper limit is exceeded, high-molecular-weight aromatic oligoesters having a degree of polymerization of 3 or more are formed and, at the same time, there remains a large amount of the unreacted dihydric phenolic compound that did not participate in the reaction to cause a decline in the regularity of the alternating configuration of the components making up the intended polymer, with the consequence that adverse effects are had on the heat resistance and resistance to hot water of the polymer. On the other hand, when the amount used of the basic inorganic compound is less than the lower limit, the unreacted aromatic dicarboxylic acid dichloride A remains, and not only is there a decline in the yield of the desired aromatic oligoester, but also the properties of the product polymer are impaired.

Another condition for obtaining the desired oligoester in the first step of this invention is to use the aromatic dicarboxylic acid dichloride A in an amount in the range of 0.3-0.7 mole per mole of the dihydric phenolic compound. When this amount is less than the lower limit, there is an increase in the unreacted dihydric phenolic compound, whereas when the upper limit is exceeded, the degree of polymerization is increased. As a consequence, the regularity of the alternating configuration of the components making up the resulting copolymer declines to make it impossible to obtain a polymer having the properties intended by the present invention.

The dihydric phenolic compound used in the process of this invention is suitably selected from the group consisting of the bisphenol-type compounds of the formula

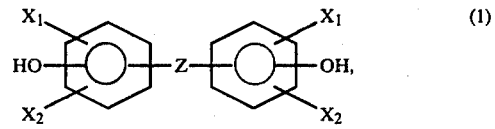

the dihydric phenolic compounds of the formula

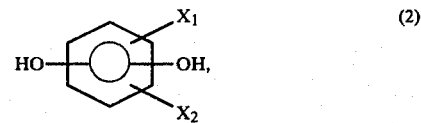

and the phenolphthalein-type compounds of the formula

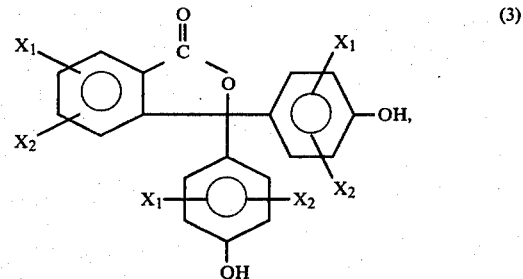

in which general formulas $X_1$ and $X_2$ are each a member of the group consisting of hydrogen, chlorine, bromine and the lower alkyl groups, and Z is a straight-chain or branched alkylene group of fewer than 9 carbon atoms or a bridging member selected from the class consisting of the —O—, —S—, —CO— and —SO$_2$— groups. As typical examples of the compounds of these general formulas, included are 2,2-bis(4-hydroxyphenyl)propane, 2,2-bis(3,5-dibromo-4-hydroxyphenyl)propane, 2,2-bis(3,5-dichloro-4-hydroxyphenyl)propane, bis(4-hydroxyphenyl)methane, bis(4-hydroxyphenyl)sulfone, bis(4-hydroxyphenyl)ketone, hydroquinone, resorcinol and phenolphthalein. The dihydric phenolic compound is preferably used in such an amount that its concentration in the aqueous phase of the reaction medium used in the first step is in the range of 0.05-2 moles, preferably 0.1-1.0 mole, per liter.

As the aromatic dicarboxylic acid dichloride to be used in the process of this invention, included are say terephthaloyl dichloride, 2-chloroterephthaloyl dichloride, 2,5-dichloroterephthaloyl dichloride, 2,3,5,6-tetrachloroterephthaloyl dichloride, isophthaloyl dichloride, 4-chloroisophthaloyl dichloride and 5-chloroisophthaloyl dichloride. These aromatic dicarboxylic acid dichlorides are usually rendered into a homogeneous solution by dissolving them in a water-immiscible solvent and then catalytically reacted by adding the resulting solution dropwise with stirring to the aqueous phase containing the dihydric phenolic compound.

In the process of this invention whose object is to produce the aromatic polyester copolymers, the expected objects are achieved by varying the class of the aromatic dicarboxylic acid dichloride used in the first and second steps of the process. In this sense, the aromatic dicarboxylic acid dichloride A and aromatic dicarboxylic acid dichloride B should be differentiated. If, of the aromatic dicarboxylic acid dichlorides exemplified hereinbefore, one is chosen as the aromatic dicarboxylic acid dichloride A, in correspondence therewith there is chosen the aromatic dicarboxylic acid dichloride B that is used to make up the desired copolymer. Broadly speaking, the aromatic dicarboxylic acid dichloride A or the aromatic dicarboxylic acid dichloride B can be suitably chosen, but it is usually preferred that one be chosen from terephthaloyl dichloride and its derivatives while the other be chosen from isophthaloyl dichloride and its derivatives.

In practicing the process of this invention the aromatic dicarboxylic acid dichloride A is preferably used in such an amount that its concentration in the water-immiscible solvent phase in the first step is 0.05-2 moles per liter, and preferably 1-1.5 moles per liter.

The water-immiscible solvent, as used herein, is an organic solvent which, when mixed with water, does not completely dissolve therein, but in which at least a part thereof separates from water to form two layers. It furthermore is an organic solvent that can dissolve the aromatic dicarboxylic acid dichlorides while being inert thereto, as well as can dissolve the intended aromatic polyester copolymer. Typical examples of such an organic solvent are the chlorinated hydrocarbons such as methylene chloride, 1,2-dichloroethane, 1,1,2,2-tetrachloroethane, chloroform, 1,1,1-trichloroethane, carbon tetrachloride, monochlorobenzene and dichlorobenzene; the aromatic hydrocarbons such as benzene, toluene, xylene and ethylbenzene; and the aliphatic ether compounds such as diethyl ether. These organic solvents can also be used in combination of two or more thereof. If desired, these water-immiscible solvents can also be used mixed with those solvents that have affinity for water such as ethers other than that mentioned above, ketones, esters and nitriles. It goes without saying that the proportion in which these solvents are mixed with the water-immiscible solvents is imposed a limitation in that there must not be complete compatability between the mixed solvents and water. The mixture ratio between the water-immiscible solvent and water may be in the range of 50/1-1/40 by volume, but from the standpoint of the operational management of the process of this invention, a range of 5/1-1/5 is preferred.

One specific mode of practicing the first step of this invention is carried out in the following manner. A solution of an aromatic dicarboxylic acid dichloride A in a water-immiscible solvent is continuously added dropwise with stirring to an aqueous phase containing a dihydric phenolic compound and a basic inorganic compound over a period of time ranging from several seconds to several hours. For controlling the esterification reaction, it is also possible to employ another method, which comprises adding a part of the basic inorganic compound to the aqueous phase and then adding the remainder dropwise as an aqueous solution along with the dichloride. If the time required for the addition is too long, a degradation of the starting material is brought about, whereas if the time is too short, adverse effects are had on the properties of the final copolymer. A reaction temperature in the range of 0°-75° C., and preferably 5°-50° C., will do. While the time required for completing the esterification reaction will vary depending upon the reaction conditions, usually up to 3 hours should be sufficient. For preventing the discoloration of the dihydric phenolic compound and, in turn, the discoloration of the resulting aromatic polyester copolymer, it is effective to add a reducing agent such as sodium hydrosulfite in the first step. Such a practice is suitably employed.

When the solubility in an organic solvent such as methylene chloride of the aromatic dihydroxy oligoester obtained in the first step is considered, the isophthaloyl dichlorides can be preferably used rather than the terephthaloyl dichlorides in the reaction of the first step, and this will make it possible to carry out the reaction of the second step smoothly.

The aromatic dicarboxylic acid dichloride B used in the second step is used in such an amount that when summed up with the amount of the aromatic dicarboxylic acid dichloride A used in the first step, the total sum ranges between 1.0 and 1.5 moles per mole of the dihydric phenolic compound. It is usually preferred to use the aromatic dicarboxylic acid chloride A and the aromatic dicarboxylic acid dichloride B in a molar ratio of 3:7-7:3. While the second step is carried out in the co-presence of a basic inorganic compound as in the case with the first step, the amount of the basic inorganic compound used in this case should be an amount sufficient to neutralize the free phenolic hydroxyl groups contained in the reaction product mixture. Furthermore, the amount of the basic inorganic compound should preferably be in the range of 2-3.5 moles per mole of aromatic dicarboxylic acid dichloride that is added dropwise in the second step.

For promoting the reaction of the second step and thus obtaining the intended copolymer having a high molecular weight, it is preferred that a quarternary ammonium salt or a tertiary amine be added as a catalyst. Examples of the quarternary ammonium salts include trimethylbenzyl ammonium chloride, triethylbenzyl ammonium chloride and tetrabutyl ammonium bromide. And as the tertiary amines, there can be mentioned, for example, trimethylamine, tributylamine, tripropylamine, trihexylamine, N,N-dimethylcyclohexylamine, pyridine, quinoline and dimethylaniline. These catalysts may used either singly, or two or more classes may be used conjointly. It will suffice to use these catalysts in an amount of not more than 0.5 mole per mole of the dihydric phenolic compound. A molecular weight control agent is suitably used in the second step for obtaining the intended aromatic polyester copolymer having the desired molecular weight. The molecular weight control agent may be added at the time of synthesizing the aromatic oligoester in the first step or at the time of polymerization reaction by the esterification in the second step. Examples of usable molecular weight control agents are the monohydric phenols such as phenol, o-phenylphenol, p-phenylphenol, o-methoxyphenol, m-methoxyphenol, cumyl phenol and p-tert.-butyl phenol; the monobasic acid chlorides such as benzoic acid monochloride; and the monoamines such as aniline. The amount used of the molecular weight control agent is suitably chosen such as to come within the range of 0.001-0.1 mole per mole of the dihydric phenolic compound used in the first step.

In one specific mode of practicing the second step, an aqueous solution of the basic inorganic compound and molecular weight control agent is added along with a polycondensation promoting catalyst to the oligoester-containing reaction product mixture obtained in the first step, following which the water-immiscible solvent solution of the aromatic dicarboxylic acid dichloride B is added dropwise with stirring. While the period of time over which the addition of the aromatic dicarboxylic acid dichloride B is made can be chosen from that ranging from several seconds to several hours, the addition is usually completed in several seconds to several tens of minutes. A reaction temperature of 0°–75° C., and preferably 5°–50° C., is used. A time of up to about 3 hours after completion of the addition of the aromatic dicarboxylic acid dichloride B should be sufficient for concluding the polymerization reaction.

The second step of this invention can also be carried out in the following manner. The foregoing esterification reaction can be performed by using the water-immiscible solvent solution containing the desired aromatic oligoester of a degree of polymerization of 1–2 after allowing the reaction product mixture obtained in the first step to stand and separate into two layers. Alternatively, the second step can also be carried out by isolating the desired aromatic dihydroxy oligoester from the reaction product mixture obtained in the first step, thus eliminating the unreacted dihydric phenolic compound and oligoesters having a degree of polymerization of 3 or more, and thereafter submitting the resulting aromatic dihydroxy oligoester to the second step to give the aromatic polyester copolymer. The isolation of the aromatic dihydroxy oligoester having a degree of polymerization of 1–2 can be carried out, for example, in the following manner. After completion of the reaction of the first step, the reaction product mixture is left to stand and separate into two layers, and then the resulting water-immiscible solvent solution is concentrated to dryness. The solid product thus obtained is dissolved in acetone and, after removing the acetone-insoluble portion by filtration, water, a poor solvent for the acetone solution, is added to precipitate out the desired oligoester.

In obtaining the intended aromatic polyester copolymer from the reaction product mixture whose polymerization reaction has been completed in the second step of this invention, the following procedure is followed. After separating the reaction product mixture into two layers by allowing it to stand, the water-immiscible solvent solution is separated from the reaction product mixture, following which it is submitted to such operations as washing and solidification in customary manner. When difficulty is experienced in effecting the separation of the reaction product mixture into two layers, such known operations as adjustment of pH, addition of a salting out agent or centrifugation may be employed. The solidification of the polymer can be carried out in customary manner. For example, usable is a method of completely distilling off the water-immiscible solvent under atmospheric or reduced pressure, or that of adding a poor solvent for the resulting polymer that dissolves in the water-immiscible solvent used in the reaction but does not dissolve the resulting polymer, for example, the organic solvents such as methanol, ethanol, acetone, ethyl acetate, isopropyl ether, n-hexane, cyclohexane and methyl ethyl ketone or, conversely, that of adding the water-immiscible solvent solution to these poor solvents.

In a method which uses these poor solvents, the water-immiscible solvent solution, the reaction product mixture, can be concentrated to a certain degree in advance, thus reducing the amount of the poor solvent used. It is hence an effective method.

The following examples will serve to illustrate the present invention more specifically.

EXAMPLE 1

A 1-liter reaction vessel equipped with a stirrer was charged with 24.168 g (0.1059 moles) of bisphenol A (BPA), 0.052 g of sodium hydrosulfite, 150 ml of methylene chloride and 150 ml of the 450 ml of an alkaline aqueous solution wherein has been dissolved 4.72 g (0.118 mole) of sodium hydroxide. The remaining 300 ml of the aqueous sodium hydroxide solution and a solution of 10.764 g (0.05302 mole) of isophthaloyl dichloride in 150 ml of methylene chloride were separately charged to dropping funnels and added dropwise continuously to the reaction vessel with stirring over the course of 80 minutes. During this period the reaction temperature was maintained at 10°–12° C. After completion of the additions of the aqueous sodium hydroxide solution and the methylene chloride solution of isophthaloyl dichloride, the reaction was continued for a further 40 minutes under the same conditions to complete the reaction of the first step. After completion of the first step reaction, a solution of 5.29 g (0.13225 mole) of sodium hydroxide in 150 ml of water, 0.5 g of p-tert.-butylphenol, 0.154 g of trimethylbenzyl ammonium chloride and a solution of 10.764 g (0.05302 mole) of terephthaloyl dichloride in 60 ml of methylene chloride were all added simultaneously at once to the reaction product mixture obtained in the reaction of the first step. After the addition of the terephthaloyl dichloride, the reaction was continued for a further one hour with stirring while maintaining the reaction temperature at 20°–22° C. One hour after the initiation of the second step reaction, 0.5 g of p-tert.-butylphenol was again added, following which the reaction was continued for another hour to complete the whole reaction.

The methylene chloride phase that separated out on standing after completion of the reaction was collected and washed several times in water, after which the resulting methylene chloride solution was concentrated under reduced pressure until the concentration of the volatile portion became 20% by weight. To this solution were then added 30 ml of methanol and 60 ml of acetone. Five minutes after the addition of the methanol and acetone, a powdery white said was formed. On separation of this from the solvent and vacuum drying at 100° C. for 24 hours, there was obtained 37.80 g (96.5% of the theoretical yield) of a copolymer. The inherent viscosity ($\eta$ inh) of this copolymer as measured at 25° C. on a methylene chloride solution of the copolymer at a concentration of 1 g/100 ml was 0.481. The inherent viscosity ($\eta$ inh) was calculated by means of the following equation.

$$\eta\ inh = \frac{\ln(t_1/t_0)}{C}$$

where:
C is the concentration of the copolymer in the methylene chloride solution (g/dl)
$t_0$ is the falling time of methylene chloride alone (sec)
$t_1$ is the falling time of the methylene chloride solution of the copolymer (sec)

A compression molded piece obtained by heat-melting this copolymer at 350° C. for 10 minutes in an atmosphere of nitrogen was transparent. When this test specimen was used, and the glass transition temperature (Tg) of the polymer was determined by the thermo mechanical analysis method described in Zakin, J. L. et al., J. Apply. Polymer Sci., vol. 10, page 1455 (1966) it was 189° C., while the heat distortion temperature under load as measured by the ASTM Method D-648 (HDT, 264 psi) was 181° C. When a molded piece prepared in similar manner was treated by dipping it in hot water of 120° C. for 60 hours, no formation of crazes in the polymer nor its devitrification was noted. The superior resistance to hot water of the copolymer was thus demonstrated.

EXAMPLE 2

The reaction of the first step was carried out by the same procedure and conditions as in Example 1. However, in the second step the time for making the second addition of the p-tert.-butyl phenol for controlling the molecular weight was changed to 30 minutes after initiation of the second step reaction. There was thus obtained the intended copolymer having an η inh of 0.434 and a Tg of 185° C.

EXAMPLE 3

A reaction vessel was charged with 24.168 g (0.1059 mole) of bisphenol A, 0.052 g of sodium hydrosulfite and 2.073 g (0.05183 mole) of sodium hydroxide, after which 167 ml of water was added to dissolve the components. This was followed by the addition of 150 ml of methylene chloride and stirring of the mixture while maintaining the temperature at 20°-22° C. A solution of 14.352 g (0.07069 mole) of isophthaloyl dichloride in 150 ml of methylene chloride and a solution of 4.146 g (0.10365 mole) of sodium hydroxide in 333 ml of water were then continuously added dropwise to the reaction vessel with stirring for 30 minutes, following which the reaction was continued for a further 90 minutes to complete the reaction of the first step. To the reaction product mixture obtained in the first step were then added dropwise at once a solution of 7.716 g (0.038006 mole) of terephthaloyl dichloride in 60 ml of methylene chloride, a solution of 3.79 g (0.09475 mole) of sodium hydroxide in 150 ml of water, 0.5 g of p-tert.-butyl phenol and 0.204 ml of triethylamine, with stirring. Sixty minutes later, 0.5 g of p-tert.-butyl phenol was again added, following which the reaction was continued for a further 60 minutes to yield the intended copolymer. The copolymer thus obtained had an η inh of 0.482, a Tg of 183° C. and a HDT (264 psi) of 175° C.

EXAMPLE 4

A copolymer was obtained by the same procedure and conditions as in Example 3 but using in the first step terephthaloyl dichloride instead of isophthaloyl dichloride and in the second step isophthaloyl dichloride instead of terephthaloyl dichloride. The copolymer thus obtained had an η inh of 0.504, a Tg of 192° C. and a HDT (264 psi) of 183° C.

EXAMPLE 5

A solution of 96.356 g (0.42206 mole) of bisphenol A, 0.21 g of sodium hydrosulfite and 6.27 g (0.15676 mole) of sodium hydroxide in 1500 ml of water was charged to a 5-liter reaction vessel equipped with a stirrer, along with 400 ml of methylene chloride. A solution of 42.91 g (0.21136 mole) of isophthaloyl dichloride in 400 ml of methylene chloride and a solution of 12.53 g (0.31325 mole) of sodium hydroxide in 1000 ml of water were then continuously added dropwise to the reaction vessel with stirring over the course of 80 minutes while maintaining the reaction temperature at 10°-12° C. After completion of the addition, the reaction was continued for a further 70 minutes to complete the first step. This was followed by the addition of 0.684 g of trimethylbenzyl ammonium chloride, 1.99 g of p-tert.-butyl phenol and 21.09 g (0.52725 mole) of sodium hydroxide, along with 1500 ml of water, after which a solution of 42.91 g (0.21136 mole) of terephthaloyl dichloride in 500 ml of methylene chloride was added dropwise with stirring. Sixty minutes after initiation of the second step reaction, 1.99 g of p-tert.-butyl phenol was again added followed by continuing the reaction for a further 60 minutes to yield a copolymer. A test specimen obtained by molding this copolymer was transparent, and it had an η inh of 0.542, a Tg of 190° C. and a HDT (264 psi) of 181° C.

COMPARATIVE EXAMPLE

A 5-liter reaction vessel was charged with 123.12 g (0.5393 mole) of bisphenol A, 47.85 g (1.1963 moles) of sodium hydroxide, 0.26 g of sodium hydrosulfite, 0.684 g of trimethylbenzyl ammonium chloride, 2.575 g of p-tert.-butyl phenol and 2820 ml of water, and a homogeneous solution was formed with stirring. While maintaining the reaction temperature at 20°-22° C., a solution of 54.88 g (0.27032 mole) of terephthaloyl dichloride and 54.88 g (0.27032 mole) of isophthaloyl dichloride in 1730 ml of methylene chloride was all added at once. Sixty minutes after initiation of the reaction, 2.576 g of p-tert.-butyl phenol was again added, following which the reaction was continued for a further 120 minutes. Then, by operating as in Example 1 the reaction product mixture thus obtained was washed followed by concentration of the methylene chloride phase and solidification of the product by the addition of methanol and acetone to obtain the copolymer in a powdery state. The time required for the solidification after addition of the methanol and acetone was 60 minutes. The η inh of the resulting copolymer was 0.546. When the copolymer was compression molded at 350° C. for 10 minutes in a nitrogen atmosphere, and a test specimen thus obtained was dipped in 120° C. hot water for 20 hours, numerous crazes were noted. The Tg of the compression molded article was 180° C., and its HDT (264 psi) was 170° C. Thus, this copolymer had a poorer heat resistance and resistance to hot water when compared with the copolymer obtained by the process of the instant invention.

What is claimed is:

1. A process for producing an aromatic polyester copolymer wherein the alternating configuration of the components making up the copolymer is highly regular, said process comprising a first step of reacting a dihydric phenolic compound with an aromatic dicarboxylic acid dichloride A in a reaction medium consisting of water and a water-immiscible solvent in the presence of a basic inorganic compound to give a phenolic hydroxyl-terminated aromatic oligoester containing predominantly an oligomer having a degree of polymerization of 1-2, and a second step of reacting the aromatic dihydroxy oligoester obtained in the first step with an aromatic dicarboxylic acid dichloride B in the presence of a basic inorganic compound in an amount at least sufficient to neutralize the free phenolic hydroxyl groups remaining in the reaction product mixture obtained in the first step.

2. The process as defined in claim 1 wherein said basic inorganic compound used in the first step is used in an amount in the range of 0.6 to 1.4 moles per mole of the dihydric phenolic compound.

3. The process as defined in claim 1 wherein said aromatic dicarboxylic acid dichloride A used in the first step is used in an amount in the range of 0.3 to 0.7 mole per mole of the dihydric phenolic compound.

4. The process as defined in claim 1 wherein said aromatic dicarboxylic acid dichloride A is a member selected from the group consisting of terephthaloyl dichlorides and isophthaloyl dichlorides, and said aromatic dicarboxylic acid dichloride B, in complement with said aromatic dicarboxylic acid dichloride A, is a member chosen from the group consisting of isophthaloyl dichlorides and terephthaloyl dichlorides.

5. The process as defined in claim 1 wherein said aromatic dicarboxylic acid dichloride A and said aromatic dicarboxylic acid dichloride B are used in a molar ratio ranging from 3:7 to 7:3.

* * * * *